United States Patent
Boyd

(10) Patent No.: US 7,264,014 B2
(45) Date of Patent: Sep. 4, 2007

(54) SAFETY SYSTEM HOSE

(75) Inventor: Richard C. Boyd, Fort Myers, FL (US)

(73) Assignee: Jeffrey Goldstein ( * ) Notice: Subject to any disclaimer, the term of this patent is extended or adjusted under 35 U.S.C. 154(b) by 0 days.

(21) Appl. No.: 11/214,202

(22) Filed: Aug. 29, 2005

(65) Prior Publication Data
US 2007/0044853 A1   Mar. 1, 2007

(51) Int. Cl.
F16K 17/36 (2006.01)
F16K 17/40 (2006.01)
F16L 55/10 (2006.01)

(52) U.S. Cl. ................ 137/68.14; 137/614.04
(58) Field of Classification Search ............. 137/68.14, 137/614.04
See application file for complete search history.

(56) References Cited
U.S. PATENT DOCUMENTS 3,630,214 A * 12/1971 Levering ................ 137/68.14
4,119,111 A * 10/1978 Allread .................. 137/68.14
4,872,471 A * 10/1989 Schneider ............... 137/68.14
5,357,998 A    10/1994 Abrams
6,260,569 B1   7/2001 Abrams
6,513,556 B1   2/2003 Nimberger
6,546,947 B2   4/2003 Abrams

* cited by examiner

Primary Examiner—John Rivell
(74) Attorney, Agent, or Firm—Jennifer Meredith, Esq.; Meredith & Keyhani, PLLC

(57) ABSTRACT

A safety system for a fluid conduit having: a hose; a first and second housing connected to the hose, each housing having a first and second opening and an internal cavity having a first cavity and a first recess; a perforated retention tube positioned longitudinally within hose; a first valve seat disposed in the first housing and a second valve seat disposed in second housing; a first valve body pivotally attached to the first housing at a first pivot point and having a first tab protrusion protruding through the perforated retention tube and a second valve body pivotally attached to the second housing at a second pivot point and having a second tab protrusion protruding through the perforated retention tube.

18 Claims, 3 Drawing Sheets

SAFETY SYSTEM HOSE

BACKGROUND OF THE INVENTION

This invention relates generally to transfer hose, and more particularly a safety system hose for a fluid conduit.

Transfer hose are often used to deliver compressed gases such as hydrogen, oxygen, propane or liquefied petroleum products. During use of the hose, the transfer hose may inadvertently become severed, split or rupture. Most hoses, upon failure, will allow product to continue to be expelled until manually shut-off. Another problem, is continued whipping of the hose as the product is expelled, which can cause injury. During the failure, the hose may also be leaking hazardous fumes into the surrounding environment. The fumes may cause sickness or even be explosive.

One prior art attempt to solve the problem uses an attachment of an exterior cable to the length of the hose. This does not, however, stop the flow of product but simply contains a severed hose from whipping. Other devices may eliminate whipping and also check the flow of product. However, their design typically may also prematurely check the flow during normal operation.

There is a need within the art to provide a hose that stops the flow of product and eliminates whipping without prematurely checking flow during normal operation.

SUMMARY OF THE INVENTION

The present invention relates generally to safety systems for fluid conduits, and more specifically to systems which, in the event of failure stops the flow of product and eliminates continual whipping without prematurely checking flow during normal operation.

According to a first embodiment, A safety system for a fluid conduit comprising: a hose having a first and second end; a first housing connected to the first end of the hose, the first housing having a first and second opening and an internal cavity having a first cavity and a first recess; a second housing connected to the second end of the hose, the second housing having a first and second opening and an internal cavity having a second cavity and a second recess; a perforated retention tube having first and second ends, the perforated retention tube being positioned longitudinally within the hose; a first valve seat disposed in the first housing and a second valve seat disposed in the second housing, the first and second valve seats positioned a first predetermined distance from each other; a first valve body pivotally attached to the first housing at a first pivot point and having a first tab protrusion protruding through the perforated retention tube and a second valve body pivotally attached to the second housing at a second pivot point and having a second tab protrusion protruding through the perforated retention tube.

According to another embodiment, a safety system for a fluid conduit comprising: a hose having a first and second end; a first housing connected to the first end of the hose, the first housing having a first and second opening and an internal cavity having a first cavity and a first recess; a second housing connected to the second end of the hose, the second housing having a first and second opening and an internal cavity having a second cavity and a second recess; a perforated retention tube having first and second ends, the perforated retention tube being positioned longitudinally within in communication with and lining the hose; a first valve seat disposed in the first housing and a second valve seat disposed in the second housing, the first and second valve seats positioned a first predetermined distance from each other; a first valve body pivotally attached to the first housing at a first pivot point and having a first tab protrusion at an angle between 30 and 60 degrees protruding through the perforated retention tube and a second valve body pivotally attached to the second housing at a second pivot point and having a second tab protrusion at an angle between 30 and 60 degrees protruding through the perforated retention tube, wherein the first recess retains the first valve body during an open flow condition substantially out of the flow path of the fluid and the second recess retains the second valve body during an open flow condition substantially out of the flow path of the fluid, the first tab protrusion closing the first valve body during a closed flow condition to seal the path of the fluid and the second tab protrusion closing the second valve body during a closed flow condition to seal the path of the fluid.

According to yet another embodiment, a safety system for a fluid conduit comprising: a hose having a first and second end; a first housing connected to the first end of the hose, the first housing having a first and second opening and an internal cavity having a first cavity and a first recess; a first ferrule for sealing the first housing to the first end of the hose; a second housing connected to the second end of the hose, the second housing having a first and second opening and an internal cavity having a second cavity and a second recess; a second ferrule for sealing the second housing to the second end of the hose; a perforated retention tube having first and second ends, the perforated retention tube being positioned longitudinally within in communication with and lining the hose; a first tube retainer circumferentially surrounding the perforated retention tube and between the internal cavity and the first cavity; a second tube retainer circumferentially surrounding the perforated retention tube and between the internal cavity and the second cavity; a first valve seat disposed in the first housing and a second valve seat disposed in the second housing, the first and second valve seats positioned a first predetermined distance from each other; a first valve body pivotally attached to the first housing at a first pivot point and having a first tab protrusion at an angle between 30 and 60 degrees, the first tab having a top and a bottom, the bottom being attached to the first valve body and the top is wider than the bottom, the first tab protruding through the perforated retention tube and a second valve body pivotally attached to the second housing at a second pivot point and having a second tab protrusion at an angle between 30 and 60 degrees, the second tab having a top and a bottom, the bottom being attached to the second valve body and the top is wider than the bottom, the second tab protruding through the perforated retention tube, wherein the first recess retains the first valve body during an open flow condition substantially out of the flow path of the fluid and the second recess retains the second valve body during an open flow condition substantially out of the flow path of the fluid, the first tab protrusion closing the first valve body during a closed flow condition to seal the path of the fluid and the second tab protrusion closing the second valve body during a closed flow condition to seal the path of the fluid.

This summary is not to be taken in a limiting sense, but is made merely for the purpose of illustrating the general principles of the invention, since the scope of the invention is best defined by the appended claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
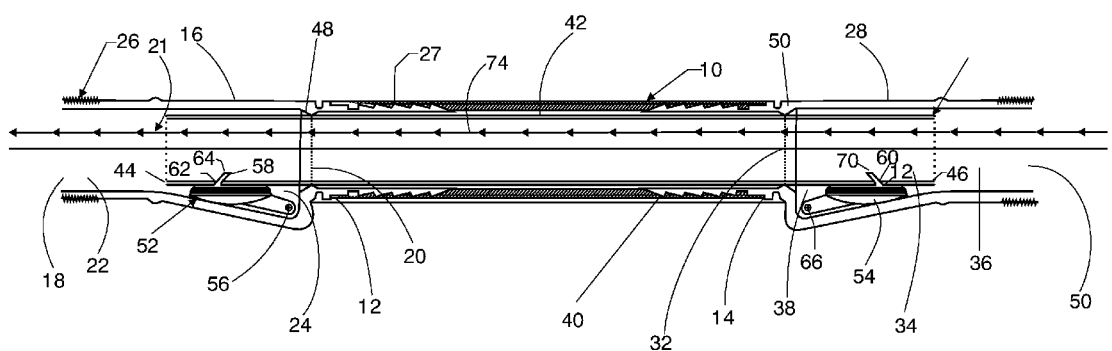
FIG. 1 depicts a side view according to the present invention.
Figure 2:
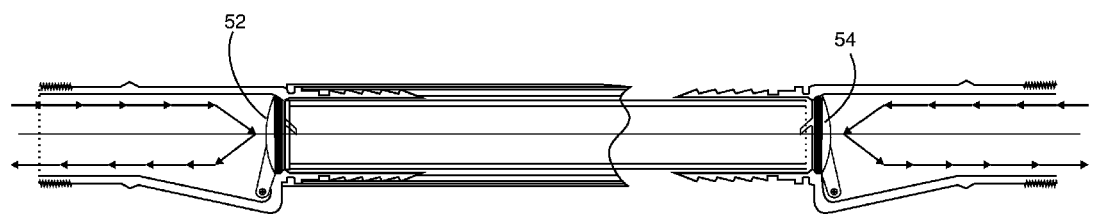
FIG. 2 depicts a side view according to the present invention.
Figure 3:
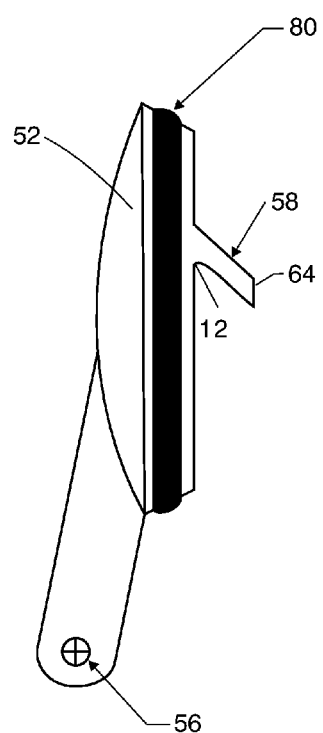
FIG. 3 depicts a side view of a valve body according to the present invention.

As described herein and with reference to FIGS. 1-3, the present invention provides a safety system for a fluid conduit. There may be a hose (10) having a first (12) and second end (14); a first housing (16) connected to the first end (12) of the hose (10), the first housing (16) having a first (18) and second opening (20) and an internal cavity (21) having a first cavity (22) and a first recess (24). It should be understood that the first cavity (22) is the area inside the internal cavity. There may also be threads 26 for attaching the hose. There may be a first ferrule (27) for sealing the first housing (16) to the first end (12) of the hose (10). There may also be a second housing (28) connected to the second end (14) of the hose (10). The second housing (28) having a first (30) and second opening (32) and an internal cavity (34) having a second cavity (36) and a second recess (38). There may also be a second ferrule (40) for sealing the second housing (28) to the second end (14) of the hose (10). There is also a perforated retention tube (42) having first (44) and second (46) ends.

The perforated retention tube (42) is preferably positioned longitudinally within, in communication with and lining the hose (10). The perforated retention tube (42) may be perforated throughout with numerous perforations or have just two perforations to allows the tabs to protrude through. The tabs hold the perforated retention tube (42) in place and prevent the perforated retention tube (42) from moving longitudinally. There may also be a first tube retainer, which may be circumferentially surrounding the perforated retention tube (42), and may be in the internal cavity. There may also be a second tube retainer circumferentially surrounding the perforated retention tube and in the internal cavity. The first tube retainer and the second tube retainer are entirely optional and not required. There is a first valve seat (48) disposed in the first housing (16) and a second valve seat (50) disposed in the second housing (28), the first and second valve seats (48, 50) positioned a first predetermined distance from each other. There is also a first valve body (52) pivotally attached to the first housing at a first pivot point (56) and having a first tab (58) protrusion at an angle between 30 and 60 degrees, the first tab (58) having a top (64) and a bottom (62), the bottom (62) being attached to the first valve body (52) and the top (64) is wider than bottom (62). The first tab (58) protrudes through the perforated retention tube (42) when in an open position so as to hold the perforated retention rube (42) in place. The angle of the first tab (58) protrusion allows the perforated retention tube (42) to catch and be held in place. The first tab (58) protrusion is on the side of the first valve body (52) that is open, not the side of the first valve body (52) that rests in the first recess (24) which is preferably smooth and rounded.

Figure 4:
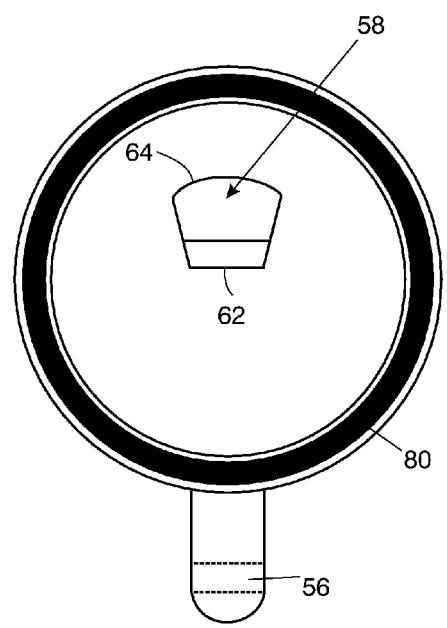
FIG. 4 depicts a front view of a valve body according to the present invention.

Turning to FIGS. 3-4, as shown, a valve body is depicted. This may be either the first valve body (52) or the second valve body (54), as they may be identical. As shown, the first valve body (52) is a rounded shape and has an o-ring (80) attached thereto. The first tab (58) has a top (64) and a bottom (62). The top (64) may be large than the bottom (62). However, this is not required. The top (64) being wider than the bottom (62) may keep the perforated retention tube in place better.

The second valve body (54) is also pivotally attached to the second housing (28) at a second pivot point (66) and having a second tab (60) protrusion. The second tab (60) may be at an angle between 30 and 60 degrees and have a top (70) and a bottom (72), the bottom (72) being attached to the second valve body (54) and the top (70) is wider than the bottom (72). The second tab (60) protrudes through the perforated retention tube (42). The first recess (24) retains the first valve body (52) during an open flow condition substantially out of the flow path (74) of the fluid and the second recess (38) retains the second valve body (54) during an open flow condition substantially out of the flow path (74) of the fluid, the first tab (58) protrusion closing the first valve body (52) during a closed flow condition to seal the path of the fluid and the second tab (60) protrusion closing the second valve body (54) during a closed flow condition to seal the path of the fluid. FIG. 2 depicts a closed flow condition as in during a failure, the first valve body (52) and the second valve body (54) are in the closed position. Accordingly, there would be no loss of gas and no whipping.

This description is not to be taken in a limiting sense, but is made merely for the purpose of illustrating the general principles of the invention, since the scope of the invention is best defined by the appended claims.

I claim:

1. A safety system for a fluid conduit comprising:
    a hose having a first and second end;
    a first housing connected to said first end of said hose, said first housing having a first and second opening and an internal cavity having a first cavity and a first recess;
    a second housing connected to said second end of said hose, said second housing having a first and second opening and an internal cavity having a second cavity and a second recess;
    a perforated retention tube having first and second ends, said perforated retention tube being positioned longitudinally within said hose;
    a first valve seat disposed in said first housing and a second valve seat disposed in said second housing, said first and second valve seats positioned a first predetermined distance from each other;
    a first valve body pivotally attached to said first housing at a first pivot point and having a first tab protrusion protruding through said perforated retention tube and a second valve body pivotally attached to said second housing at a second pivot point and having a second tab protrusion protruding through said perforated retention tube.

2. A system as in claim 1, wherein said first recess retains said first valve body during an open flow condition substantially out of the flow path of said fluid and said second recess retains said second valve body during an open flow condition substantially out of the flow path of said fluid, said first tab protrusion closing said first valve body during a closed flow condition to seal said path of said fluid and said second tab protrusion closing said second valve body during a closed flow condition to seal said path of said fluid.

3. A safety system as in claim 1, further comprising a first ferrule for sealing said first housing to said first end of said hose.

4. A safety system as in claim 1, further comprising a second ferrule for sealing said second housing to said second end of said hose.

5. A safety system as in claim 1, further comprising a first tube retainer circumferentially surrounding said perforated retention tube and between said internal cavity and said first cavity.

6. A safety system as in claim 1, further comprising a second tube retainer circumferentially surrounding said perforated retention tube and between said internal cavity and said second cavity.

7. A safety system as in claim 1, wherein said perforated retention tube lines said hose and is in communication with said hose.

8. A safety system as in claim 1, wherein said first tab is at an angle between 30 and 60 degrees.

9. A safety system as in claim 1, wherein said second tab is at an angle between 30 and 60 degrees.

10. A safety system as in claim 1, wherein said first tab has a top and a bottom, said bottom of said first tab being attached to said first valve body and said top of said first tab is wider than said bottom of said first tab.

11. A safety system for a fluid conduit comprising:
a hose having a first and second end;
a first housing connected to said first end of said hose, said first housing having a first and second opening and an internal cavity having a first cavity and a first recess;
a second housing connected to said second end of said hose, said second housing having a first and second opening and an internal cavity having a second cavity and a second recess;
a perforated retention tube having first and second ends, said perforated retention tube being positioned longitudinally within in communication with and lining said hose;
a first valve seat disposed in said first housing and a second valve seat disposed in said second housing, said first and second valve seats positioned a first predetermined distance from each other;
a first valve body pivotally attached to said first housing at a first pivot point and having a first tab protrusion at an angle between 30 and 60 degrees protruding through said perforated retention tube and a second valve body pivotally attached to said second housing at a second pivot point and having a second tab protrusion at an angle between 30 and 60 degrees protruding through said perforated retention tube, wherein said first recess retains said first valve body during an open flow condition substantially out of the flow path of said fluid and said second recess retains said second valve body during an open flow condition substantially out of the flow path of said fluid, said first tab protrusion closing said first valve body during a closed flow condition to seal said path of said fluid and said second tab protrusion closing said second valve body during a closed flow condition to seal said path of said fluid.

12. A safety system as in claim 11, further comprising a first ferrule for sealing said first housing to said first end of said hose.

13. A safety system as in claim 11, further comprising a second ferrule for sealing said second housing to said second end of said hose.

14. A safety system as in claim 11, further comprising a first tube retainer circumferentially surrounding said perforated retention tube and between said internal cavity and said first cavity.

15. A safety system as in claim 11, further comprising a second tube retainer circumferentially surrounding said perforated retention tube and between said internal cavity and said second cavity.

16. A safety system as in claim 11, wherein said first tab has a top and a bottom, said bottom of said first tab being attached to said first valve body and said top of said first tab is wider than said bottom of said first tab.

17. A safety system for a fluid conduit comprising:
a hose having a first and second end;
a first housing connected to said first end of said hose, said first housing having a first and second opening and an internal cavity having a first cavity and a first recess;
a first ferrule for sealing said first housing to said first end of said hose;
a second housing connected to said second end of said hose, said second housing having a first and second opening and an internal cavity having a second cavity and a second recess;
a second ferrule for sealing said second housing to said second end of said hose;
a perforated retention tube having first and second ends, said perforated retention tube being positioned longitudinally within in communication with and lining said hose;
a first tube retainer circumferentially surrounding said perforated retention tube and between said internal cavity and said first cavity;
a second tube retainer circumferentially surrounding said perforated retention tube and between said internal cavity and said second cavity;
a first valve seat disposed in said first housing and a second valve seat disposed in said second housing, said first and second valve seats positioned a first predetermined distance from each other;
a first valve body pivotally attached to said first housing at a first pivot point and having a first tab protrusion at an angle between 30 and 60 degrees, said first tab having a top and a bottom, said bottom being attached to said first valve body and said top is wider than said bottom, said first tab protruding through said perforated retention tube and a second valve body pivotally attached to said second housing at a second pivot point and having a second tab protrusion at an angle between 30 and 60 degrees, said second tab having a top and a bottom, said bottom being attached to said second valve body and said top is wider than said bottom, said second tab protruding through said perforated retention tube, wherein said first recess retains said first valve body during an open flow condition substantially out of the flow path of said fluid and said second recess retains said second valve body during an open flow condition substantially out of the flow path of said fluid, said first tab protrusion closing said first valve body during a closed flow condition to seal said path of said fluid and said second tab protrusion closing said second valve body during a closed flow condition to seal said path of said fluid.

18. A safety system as in claim 17, further comprising at least one o-ring.

* * * * *